United States Patent Office 2,957,007
Patented Oct. 18, 1960

2,957,007

O,O-DIALKYL S-[(DICYANO METHYL)ALKYL] PHOSPHOROTHIOLOTHIONATES

Marvin A. McCall and Harry W. Coover, Jr., Kingsport, Tenn., assignors to Eastman Kodak Company, Rochester, N.Y., a corporation of New Jersey No Drawing. Filed Dec. 6, 1957, Ser. No. 700,977

5 Claims. (Cl. 260—332.5)

This invention relates to new organophosphorus compounds and to their method of preparation. In a specific aspect this invention relates to the preparation of new organophosphorus compounds by the reaction of phosphorothiolothionates with certain 1,1-dicyanoethylenes and to the products of this process.

Organophosphorus compounds have evidenced marked utility and importance in many fields. For example, they have been employed as insecticides, fungicides, pesticides and in related uses. Consequently, it is of considerable importance to discover new and useful organophosphorus compounds and to have a new process for the production of organophosphorus compounds. Therefore, it is an object of this invention to provide new and useful organophosphorus compounds. It is another object of this invention to provide a novel method for preparing the new and useful organophosphorus compounds. It is still another object of this invention to provide new and valuable insecticides that can be used in various insecticidal compositions.

In accordance with this invention it has been found that new organophosphorus compounds, useful as insecticides, can be prepared by reacting phosphorothiolothionates with certain 1,1-dicyanoethylenes. The new products of this invention have the structural formula:

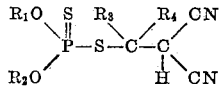

where $R_1$ and $R_2$ are selected from the group consisting of lower alkyl radicals containing from 1 to 4 carbon atoms and alkoxy alkyl radicals wherein the alkoxy and alkyl groups containing from 1 to 4 carbon atoms, $R_3$ is selected from the group consisting of hydrogen, lower alkyl containing from 1 to 4 carbon atoms and phenyl, and $R_4$ is selected from the group consisting of hydrogen, alkoxy, containing 1 to 4 carbon atoms, alkylthio, containing from 1 to 4 carbon atoms, halophenyl, nitrophenyl, thienyl, cycloalkyl, and pyridyl.

The compounds of this invention are formed by reacting a phosphorothiolothionate having the structural formula:

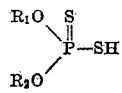

wherein $R_1$ and $R_2$ are as defined above with a 1,1-dicyanoethylene having the structural formula:

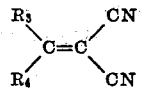

wherein $R_3$ and $R_4$ are as defined above.

In the practice of this invention we prefer to add one of the reactants gradually to a reactor containing the other reactant. For example, the 1,1-dicyanoethylene can be added gradually to a reactor containing the phosphorothiolothionate. Alternatively however, the reverse procedure of addition of reactants can be used and the phosphorothiolothionate can be added to a reactor containing the 1,1-dicyanoethylene. Normally it is desirable to employ a reactor provided with adequate means of agitation and, since the reaction is quite exothermic, it is also desirable to employ a reactor that is provided with adequate cooling means.

The operable temperature range for the reaction is generally from −25 to 150° C. and the preferred temperature range is from 25 to 100° C. However, it will be realized that in some instances temperatures outside this range can be employed. The reaction time usually varies from 0.5 to 8 hours, but longer and shorter reaction periods are sometimes used. Normally it is unnecessary to employ a catalyst for the reaction since the phosphorothiolothionate will react with the 1,1-dicyanoethylene in the absence of a catalyst. If it is considered desirable to employ a catalyst, there are certain catalysts that can be used. For example, nitrogen bases, such as pyridine and the tertiary amines, such as trialkyl amines, and the like, can be used.

Ordinarily, it is not necessary to employ a solvent for the reaction but in some instances solvents are desirable. Among the solvents that can be used are normally liquid aliphatic and aromatic hydrocarbons such as pentane, heptane, octane, benzene, toluene, the xylenes and the like, chlorinated derivatives of the above-mentioned hydrocarbons as well as the common ether and ester solvents. It is preferable to carry out the reaction using equimolar quantities of the reactants. However, the ratio of reactants is subject to wide variations.

The phosphorothiolothionates that are used in our invention can be prepared by the known reaction of 4 moles of an aliphatic alcohol with one mole of phosphorus pentasulfide. Many of the 1,1-dicyanoethylenes that are used in our reaction can be prepared by reacting malononitrile with the appropriate aldehyde according to Carson and Staughton, J.A.C.S. 50, 2825 (1928).

The following examples are illustrative of the compounds within the scope of this invention, their method of preparation and their utility as insecticides.

EXAMPLE 1

O,O-diethyl S-(1-dicyanomethyl-1-methoxyethyl) phosphorothiolothionate:

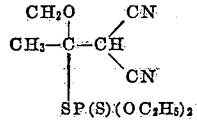

Diethyl phosphorothiolothionate (0.1 mole) was mixed with 1-methoxyethylidenemalonitrile (0.1 mole) and 5 or 6 drops of triethyl amine as catalyst. This mixture was then heated on a steam bath for 6 hours. A dark oily product was obtained which had considerable anticholinesterase activity.

EXAMPLE 2

O,O-dipropyl S-(1-dicyanomethyl-1-ethoxyethyl) phosphorothiolothionate:

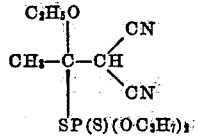

Dipropyl phosphorothiolothionate (0.1 mole) was heated on the steam bath with 1-ethoxyethylidenemalonitrile (0.1 mole) and 5 to 6 drops of triethylamine as catalyst for 3–4 hours. The product was a dark oily liquid possessing valuable insecticidal properties.

EXAMPLES 3, 4 AND 5

In like manner the following insecticidally active compounds were prepared:

O,O-bis(2-methoxyethyl)S-(1-dicyanomethyl - 1 - ethoxyethyl) phosphorothiolothionate:

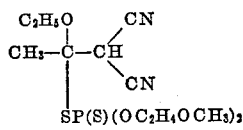

O,O-bis(2-chloroethyl)S-(1-dicyanomethyl - 1 - ethoxyethyl) phosphorothiolothionate:

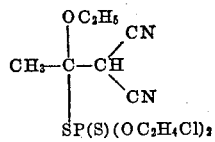

O,O-diethyl S-(1-dicyanomethyl-1-ethoxyethyl) phosphorothiolothionate:

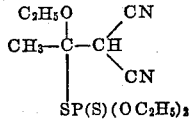

EXAMPLE 6

O,O-diethyl S-(2,2-dicyano-1-ethoxyethyl) phosphorothiolothionate:

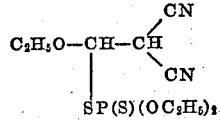

This compound was prepared by the same procedure described above from O,O-diethyl phosphorothiolothionate and ethoxymethylenemalonitrile.

EXAMPLE 7

O-ethyl O-propyl S-(α-dicyanomethyl-α-ethoxybenzyl) phosphorothiolothionate:

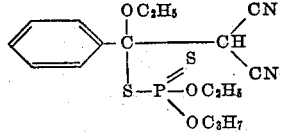

This compound was prepared by reaction of O-ethyl O-propyl phosphorothiolothionate (0.1 mole) with ethoxybenzalmalonitrile (0.1 mole) in the presence of a few drops of pyridine as catalyst.

EXAMPLE 8

O-ethyl, O-methyl S-[2,2-dicyano-1-(ethylthio)ethyl] phosphorothiolothionate:

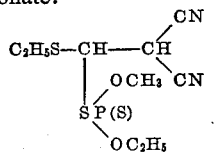

This compound was prepared from the reaction of O-ethyl, O-methyl phosphorothiolothionate (0.1 mole) and ethylthiomethylenemalonitrile (0.1 mole) in the presence of triethylamine as catalyst according to the procedure given in Example 1.

EXAMPLE 9

O,O-diethyl S-[p - chloro - α - (dicyanomethyl)benzyl] phosphorothiolothionate:

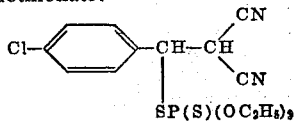

The compound was prepared by reacting p-chlorobenzalmalonitrile (0.1 mole) in benzene solvent (25 ml.) with a few drops of tributylamine as catalyst. The stirred reaction mixture was heater on the steam bath for 8 hours then vacuum stripped at 1 mm. to remove the benzene solvent and any other volatile impurity that may be present.

EXAMPLE 10

O,O-diethyl S[α-(dicyanomethyl)-m-nitrobenzyl] phosphorothiolothionate:

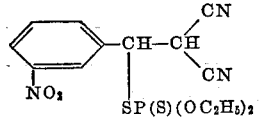

This compound was prepared by reacting meta-nitrobenzalmalonitrile (0.1 mole) in benzene (25 cc.) with O,O-diethyl phosphorothiolothionate (0.1 mole) and 6 to 8 drops of triethylamine as catalyst. The reaction mixture was heated on the steam bath for 8 hours with stirring. The benzene was removed under 1 mm. pressure leaving a dark oily product which had pesticidal properties.

EXAMPLE 11

O,O-diethyl S[o - chloro - α - (dicyanomethyl)benzyl] phosphorothiolothionate:

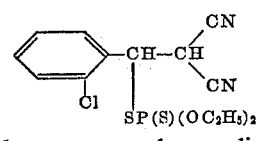

This compound was prepared according to the same procedure given in Example 9 from O,O-diethyl phosphorothiolothionate and o-chlorobenzalmalonitrile.

EXAMPLE 12

O,O-bis(2,2,2-trichloroethyl)S-[2,2 - dicyano - 1 - (2-thienyl)ethyl] phosphorothiolothionate:

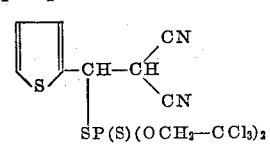

This compound was prepared from the reaction of O,O-bis(2,2,2 - trichloroethyl)phosphorothiolothionate (0.1 mole) and thienylidenemalonitrile (0.1 mole) in the presence of tripropylamine as the catalyst according to the procedure of Example 10.

EXAMPLE 13

O,O-diethyl S-(1-dicyanomethyl)cyclohexyl phosphorothiolothionate:

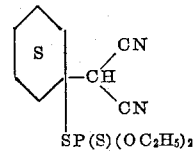

This compound was prepared by the reaction of O,O-diethyl phosphorothiolothionate (0.1 mole) and cyclohexylidenemalonitrile (0.1 mole) and triethylamine as catalyst according to the procedure of Example 9.

EXAMPLE 14

O,O-diethyl S-1-(2-pyridyl) - 2,2 - dicyanoethyl phosphorothiolothionate:

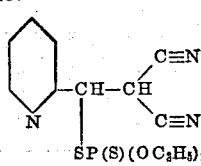

This compound was prepared by adding O,O-diethyl phosphorothiolothionate (0.1 mole) and 2-pyridylmethylenemalonitrile (0.1 mole) in the presence of triethylamine catalyst according to the procedure of Example 9.

EXAMPLE 15

O,O-diethyl S-(2,2-dicyanoethyl) phosphorothiolothionate:

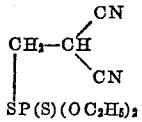

This compound was prepared by adding vinylidene cyanide in dry benzene as a diluent to O,O-diethyl phosphorothiolothionate. The mixture was stirred for 30 to 40 minutes after the addition was complete, then heated on a steam bath for 3 hours. The benzene solvent was removed by vacuum stripping at 1 mm. pressure.

EXAMPLE 16

Use of compounds as insecticides

Tests against mites were carried out in the following manner. Acetone solutions containing 1% of the candidate compounds were prepared and diluted with water to give solutions of the desired concentration for testing. Two heavily infested bean leaves containing adult two-spotted mites (*Tetranychus bimaculatus* Harvey) were carefully dipped in the above solutions and dried in a gentle air stream. The leaves were then placed on damp paper toweling in Petri dishes and observed after 24 hours for mortality among the adult mites.

It should be noted that tests using acetone-water solutions (containing none of the toxicant) kill none of the mites.

TABLE I

| Toxicant | Concentration of Toxicant in p.p.m. | Percent Kill of Mites |
|---|---|---|
| 1. O,O-Diethyl S(1-dicyanomethyl-1-methoxyethyl) phosphorothiolothionate | 100<br>30<br>10 | 100<br>95<br>90 |
| 2. O,O-Diethyl S[2,2-dicyano-1-(ethylthio)ethyl] phosphorothiolothionate | 100<br>30<br>10 | 98<br>90<br>85 |
| 3. O,O-Diethyl S[α-(dicyanomethyl)-m-nitrobenzyl] phosphorothiolothionate | 100<br>30<br>10 | 100<br>98<br>90 |
| 4. O,O-Diethyl S[O-chloro-α-(dicyanomethyl)benzyl] phosphorothiolothionate | 100<br>30<br>10 | 100<br>93<br>90 |
| 5. O,O-Bis (2,2-trichloroethyl) S-[2,2-dicyano-1-(2-thienyl) ethyl] phosphorothiolothionate | 100<br>30<br>10 | 100<br>98<br>96 |

The compounds of Examples 2–7, 9, 13, 14 and 15 were similarly effective when used in the above tests.

The pesticidal data for several monocyanoalkyl derivatives are given below in Table II. By comparison it can be seen that the dicyanoalkyl derivatives of our invention are several times more active than the simple monocyanoalkyl derivatives disclosed in the prior art and therefore the compounds of this invention are not only different structurally but also unexpectedly several times more active.

TABLE II

| Simple Cyanoalkyl Phosphorothiolothionates | Concentration in p.p.m. | Percent Kill of Mites |
|---|---|---|
| 1. O,O-Diethyl S-(2-cyano-1-methylethyl) phosphorothiolothionate.<br><br>$\underset{\underset{(C_2H_5O)_2}{}}{\overset{S}{\overset{\|}{P}}}-S-\overset{CH_3}{\underset{\|}{C H}}-CH_2CN$ | 100<br>30<br>10 | 77<br>25<br>0 |
| 2. O,O-Diethyl S-(cyanomethyl)phosphorothiolothionate.<br><br>$\underset{(C_2H_5O)_2}{\overset{S}{\overset{\|}{P}}}-S-CH_2CN$ | 100<br>30<br>10 | 85<br>60<br>15 |

We claim:

1. As a composition of matter, O,O-diethyl S-(1-dicyanomethyl-1-ethoxyethyl) phosphorothiolothionate:

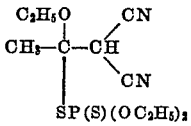

2. As a composition of matter, O-ethyl, O-methyl S-[2,2-dicyano-1-(ethylthio)ethyl] phosphorothiolothionate:

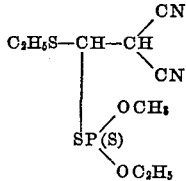

3. As a composition of matter, O,O-diethyl S[O-chloro-α-dicyanomethyl)-benzyl] phosphorothiolothionate:

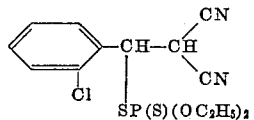

4. As a composition of matter, O,O-bis(2,2,2-trichloroethyl) S-[2,2-dicyano-1-(2-thienyl)ethyl] phosphorothiolothionate:

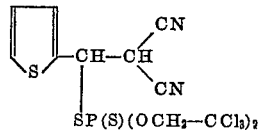

5. The organophosphorus compounds having the structural formula:

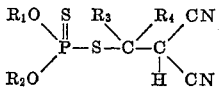

wherein $R_1$ and $R_2$ are selected from the group consisting of lower alkyl radicals and alkoxyalkyl radicals wherein the alkoxy and alkyl groups contain from 1 to 4 carbon atoms, $R_3$ is selected from the group consisting of hydrogen, lower alkyl and phenyl and $R_4$ is an organic radical selected from the group consisting of alkoxy radicals containing 1 to 4 carbon atoms, alkylthio radicals wherein the alkyl group contains 1 to 4 carbon atoms, halophenyl, nitrophenyl, thienyl, cyclohexyl and pyridyl.

References Cited in the file of this patent

Chemical Abstracts: vol. 48, p. 556*i*; p. 557*a* (1954). (Abstract of N. N. Mel'nikov et al., Doklady Akad. Nauk, U.S.S.R., vol. 86, pp. 543–6 (1952).)

Chemical Abstracts, vol. 48, p. 6639*d* (1954). (Abstract of K. A. Gar et al., Doklady Akad. Nauk, U.S.S.R., vol. 94, pp. 241–4, 1954.)

UNITED STATES PATENT OFFICE
CERTIFICATION OF CORRECTION

Patent No. 2,957,007            October 18, 1960

Marvin A. McCall et al.

It is hereby certified that error appears in the above numbered patent requiring correction and that the said Letters Patent should read as corrected below.

Column 2, lines 47 to 51, the formula should appear as shown below instead of as in the patent:

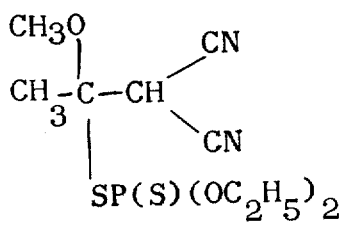

column 4, line 4, for "heater" read -- heated --; column 5, Table II, first column thereof, after item one, the formula should appear as shown below instead of as in the patent:

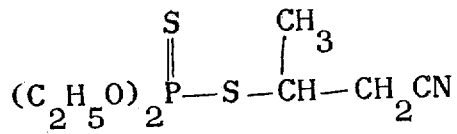

Signed and sealed this 18th day of April 1961.

(SEAL)
Attest:

ERNEST W. SWIDER
Attesting Officer

DAVID L. LADD
Commissioner of Patents